United States Patent Office.

SCHUYLER W. MAHAN, OF ADRIAN, MICHIGAN.

Letters Patent No. 105,227, dated July 12, 1870.

IMPROVEMENT IN RASPBERRY AND STRAWBERRY FRUIT SIRUP.

The Schedule referred to in these Letters Patent and making part of the same

*To all whom it may concern:*

Be it known that I, SCHUYLER W. MAHAN, of Adrian, in the county of Lenawee and State of Michigan, have invented a certain compound called Raspberry and Strawberry Fruit Sirup, to be used as a flavor for pies, cakes, custards, ice-cream, puddings, sauces, &c.; also as a beverage convertible into a wine.

The nature of this invention consists in—

First, mixing extra "C" sugar with boiling water.

Second, adding eggs and flour beat together.

Third, adding tartaric acid dissolved in boiling water, and strained all together while hot.

Fourth, adding, when nearly cool, in a certain manner and proportion, hereinafter described, alcohol, butyric ether, extract of rose, tincture of orris root, extract of orange, raspberry-juice, and strawberry-juice.

To compound and manufacture my improved raspberry and strawberry fruit sirup, take five gallons of water, put into a clean porcelain-lined, tin, or Russia-iron vessel capable of holding at least fifteen gallons; (cast-iron, copper, or brass vessels should not be used;) bring to a boiling heat; then add ten pounds of extra "C" sugar, stirring well from the bottom, to prevent burning. As soon as fully dissolved, add ten pounds more of the same kind of sugar, and continue the stirring as before, and, when all dissolved, add another ten pounds, and stir; and so on, adding ten pounds at each time, until fifty pounds shall have been added, and all thoroughly dissolved, taking great care to see that every lump of sugar is fully dissolved, for, should there be one lump not dissolved, it would fall to the bottom and become burned, and thus ruin the whole batch. (This extra "C" sugar has been found, upon experiment, to bring out a richer and more desirable flavor than any of the higher grades of sugar.) Then take two or three eggs, and to them add two tablespoonfuls of flour well beaten together. This mixture is to be added to the sugar and water immediately after the last ten pounds of sugar have been added, the temperature being, at this time, below the boiling heat. Continue the stirring until this last addition is thoroughly mixed with the whole mass.

The object of adding the flour is to subdivide the eggs, and to cause them to mix readily with the sugar and water.

The eggs not only enrich and clarify the sirup, but cause the sediment to rise to the surface, whence it must be removed by a skimmer. Continue the boiling until the sirup shall be, when cool, of the desired consistency, which may be tested by any of the well-known means. When thick enough, it is ready to be strained.

I then have already prepared one and three-fourths pound of tartaric acid, thoroughly dissolved in one and a half pint of boiling water. Strain this, through a strainer of white flannel, into the sirup, immediately following the straining of the sirup, and stir all together thoroughly with a paddle. Next comes the fruit.

I now take from one to two pounds of dried raspberries, and soak them in two quarts of water until they become soft; then boil down until about three pints of the juice of the berry can be expressed. Then pour the three pints of juice into the strained sirup, and mix thoroughly together. This produces a fine, clear, raspberry color. Next add, while the sirup is still hot, from one-fourth to one-third of the same quantity of the juice of the strawberry. If the strawberry is canned, I express directly into the sirup; if dried, I prepare the berry, and express the juice in the same manner as above described for expressing from the raspberry.

No coloring is used except the raspberry-juice, which imparts to the sirup a fine, rich, cherry color.

When nearly cool, add two and a half ounces from the following compound, prepared in the following manner, to wit:

Alcohol, eight ounces;
Butyric ether, four ounces;
Extract of rose, six drams;
Tincture of orris root, eight ounces;
Extract of orange, six drams;
Black-raspberry juice, four drams; and
Strawberry-juice, four drams.

Immediately after the addition of the two and one-half ounces above compounded, stir it all together with a paddle until it is fully mixed; then draw off into bottles, and cork them tightly.

The sirup thus compounded and bottled up is ready for use, and will not freeze in cold weather, nor be affected by the heat of summer, and will keep for any desirable length of time.

To use it as a beverage, I have only to dilute one-half ounce with three and a half to four ounces of water, thus making a very pleasant beverage.

To prepare a wine from it, take one part of rye whisky, one of the sirup, and two of water, and shake together.

Claim.

I claim as my invention—

The manufacture of a compound, which I call raspberry and strawberry fruit sirup, compounded of the several above-named ingredients, combined in the manner and proportions, and for the purposes herein set forth and described.

SCHUYLER W. MAHAN.

Witnesses:
A. L. GARDNER,
S. U. McCRARY.